N. DUNCAN.
LEVEL ATTACHMENT.
APPLICATION FILED JUNE 1, 1916.
1,229,916.
Patented June 12, 1917.
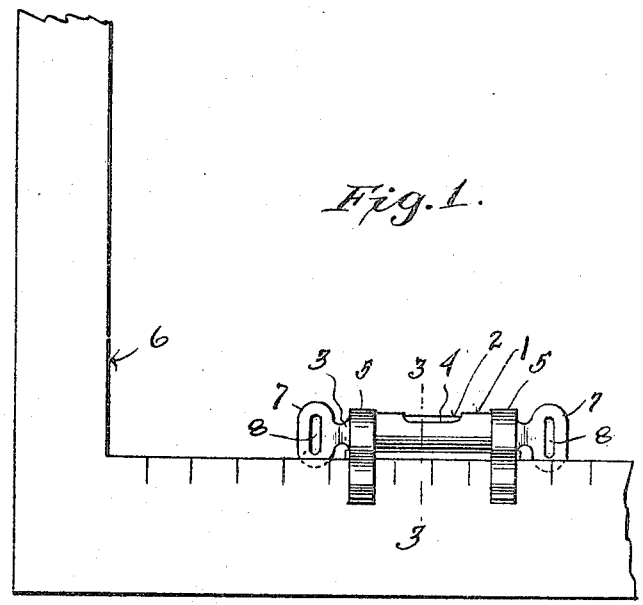
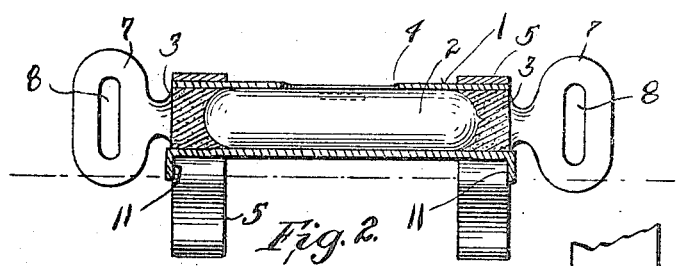
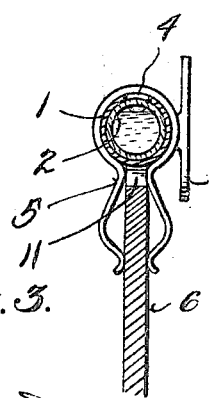
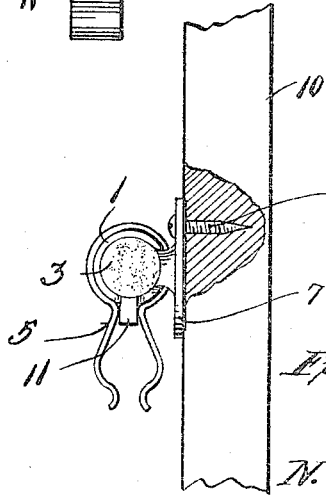
Inventor
N. Duncan

UNITED STATES PATENT OFFICE.

NORMAN DUNCAN, OF BRYN MAWR, PENNSYLVANIA.

LEVEL ATTACHMENT.

1,229,916.

Specification of Letters Patent.  Patented June 12, 1917.

Application filed June 1, 1916. Serial No. 101,070.

*To all whom it may concern:*

Be it known that I, NORMAN DUNCAN, a subject of the King of England, residing at Bryn Mawr, in the county of Montgomery, State of Pennsylvania, have invented certain new and useful Improvements in Level Attachments; and I do hereby declare the following to be a full, clear, and exact description of the invention, such as will enable others skilled in the art to which it appertains to make and use the same.

The present invention is directed to improvements in level attachments for squares or the like, and has for its object to provide a device of this character which can be easily and quickly attached to or removed from the article to which it is attached.

A further object of the invention is to provide a level of the spirit type which is constructed in such a manner that should there be any inaccuracies in the spirit tube they can be easily remedied.

With these and other objects in view, this invention resides in the novel features of construction, formation, combination and arrangement of parts to be hereinafter more fully described claimed and illustrated in the accompanying drawing, in which:—

Figure 1 is a side elevation showing it in place upon a square.

Fig. 2 is a longitudinal sectional view through the device.

Fig. 3 is a sectional view on line 3—3 of Fig. 1.

Fig. 4 is a side elevation of the device showing it in place upon a plumb or level board.

Referring to the drawing 1 indicates a metallic casing which has mounted therein the spirit tube 2, said tube being placed in the casing before the plaster of Paris fillings 3 are placed in the ends thereof. The casing 1 is provided with an opening 4 through which the bubble of the spirit level can be swung.

Engaged around the ends of the casing 1 are sheet metal clips 5, said clips being adapted to yieldably engage one of the blades of the square 6, which is of conventional form.

The ends of the casing 1 are each provided with integral offset plates 7, said plates having formed therein vertical slots 8 which are adapted to be engaged by screws 9 which are engaged with the plumb level or board 10, as shown in Fig. 4 of the drawing.

The ends of the casing 1 are provided with integral lugs 11 which are adapted to engage the adjacent edge of the blade of the square, and should there be any inaccuracies in the tube 2 it is obvious that these lugs can be filed so as to cure such defects or inaccuracies.

From the foregoing description it will be seen that an attachment has been provided which can be readily engaged with a square or level board when desired.

What is claimed is:—

A device of the class described comprising a casing, a spirit tube located in the casing, plaster fillings engaged in the ends of the casing to retain the tube therein and offset plates carried by the ends of the casing, said plates having slots formed therein for engagement by securing devices, and resilient clips secured to the ends of said casing.

In testimony whereof, I affix my signature, in the presence of two witnesses.

NORMAN DUNCAN.

Witnesses:
WILLIAM T. POUND,
THOMAS W. CRONIN.

Copies of this patent may be obtained for five cents each, by addressing the "Commissioner of Patents, Washington, D. C."